United States Patent
Rolland et al.

(10) Patent No.: US 8,184,365 B2
(45) Date of Patent: May 22, 2012

(54) OPTICAL INSTRUMENTS HAVING DYNAMIC FOCUS

(75) Inventors: Jannick P. Rolland, Chuluota, FL (US); Kevin P. Thompson, Pittsford, NY (US); Supraja Murali, Oviedo, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 632 days.

(21) Appl. No.: 12/254,077

(22) Filed: Oct. 20, 2008

(65) Prior Publication Data

US 2009/0133170 A1   May 21, 2009

Related U.S. Application Data

(60) Provisional application No. 60/981,398, filed on Oct. 19, 2007.

(51) Int. Cl.
   G02B 21/00    (2006.01)
   A61B 6/00     (2006.01)

(52) U.S. Cl. ............... 359/368; 359/205.1; 359/666; 600/476

(58) Field of Classification Search ............... 359/383, 359/368, 379–381, 205.1, 665, 666; 600/476
See application file for complete search history.

(56) References Cited

U.S. PATENT DOCUMENTS

| | | | | |
|---|---|---|---|---|
| 4,729,635 A | * | 3/1988 | Saferstein et al. | 359/804 |
| 6,263,233 B1 | * | 7/2001 | Zavislan et al. | 600/476 |
| 6,344,930 B1 | * | 2/2002 | Kaneko et al. | 359/666 |
| 7,002,737 B1 | * | 2/2006 | Akiyama et al. | 359/368 |
| 7,047,064 B1 | * | 5/2006 | Zavislan et al. | 600/476 |
| 7,098,871 B1 | * | 8/2006 | Tegreene et al. | 345/7 |
| 7,130,117 B2 | * | 10/2006 | Tsuyuki | 359/383 |
| 7,304,794 B2 | * | 12/2007 | Kitamura et al. | 359/390 |
| 7,564,621 B2 | * | 7/2009 | Kawano et al. | 359/383 |
| 7,764,433 B2 | * | 7/2010 | Kam et al. | 359/637 |
| 2005/0253055 A1 | * | 11/2005 | Sprague et al. | 250/234 |
| 2006/0103922 A1 | * | 5/2006 | Tsuyuki | 359/383 |
| 2006/0116671 A1 | * | 6/2006 | Slayton et al. | 606/27 |
| 2007/0081236 A1 | * | 4/2007 | Tearney et al. | 359/390 |
| 2007/0232874 A1 | * | 10/2007 | Ince | 600/320 |
| 2008/0204551 A1 | * | 8/2008 | O'Connell et al. | 348/79 |

* cited by examiner

Primary Examiner — Frank Font
(74) Attorney, Agent, or Firm — Thomas, Kayden, Horstemeyer & Risley, LLP

(57) ABSTRACT

An optical system suitable for use in an optical instrument such as a handheld optical probe, the optical system including a scanning element and an objective, the objective including a variable focus lens that can be electronically controlled to change the focal length of the optical system. In some embodiments, the optical system can axially and laterally scan a subject material by sequentially focusing at an axial depth using the variable focus lens and laterally scanning the material at that depth using the scanning element.

7 Claims, 8 Drawing Sheets

OPTICAL INSTRUMENTS HAVING DYNAMIC FOCUS

CROSS-REFERENCE TO RELATED APPLICATION

This application claims priority to copending U.S. provisional application entitled, "Dynamic Focusing Probe for Optical Coherence Microscopy," having Ser. No. 60/981,398, filed Oct. 19, 2007, which is entirely incorporated herein by reference.

BACKGROUND

Cancer is a major public health problem in the United States. According to the American Cancer Society, cancer causes one in four deaths in the United States. The most common form of cancer is skin cancer, which inflicts one in five Americans in their lifetime.

In some cases, skin cancer is curable if detected early and treated properly. Typically, detection is based on surgical biopsy in which a sample of the skin is excised from the patient and is dissected to check for cancerous cells. However, diagnosing skin cancer from an excised sample of skin may be disadvantageous. Because the sample excised is small and the dissection of the sample is random, a diagnosis based on biopsy may be inaccurate. If a cancer diagnosis is made, the patient may be required to return for further biopsies until the extent of the cancer is determined. Complications may also arise as a result of biopsy such as infection, hemorrhage, and the spreading of cancer cells.

An alternative method for diagnosing cancer may exploit non-invasive optical imaging techniques, such as optical coherence microscopy (OCM). OCM reconstructs an image of a cross-section of tissue from light that is reflected off of points located on or in the tissue. To ascertain the presence of cancerous cells, the image may be manually evaluated by a physician or electronically evaluated by a computer. For accurate diagnosis, it may be desirable for the image to have a relatively high resolution so that individual skin cells can be differentiated. It also may be desirable for the image to extend below the surface of skin, through the epidermis in which most skin cancers develop, and into a portion of the dermis into which most skin cancers spread. Because the imaged material is not removed from the patient, it may be desirable to image at a relatively high speed to minimize distortion associated with patient movement, such as breathing.

BRIEF DESCRIPTION OF THE FIGURES

The present disclosure may be better understood with reference to the following figures. Matching reference numerals designate corresponding parts throughout the figures, which are not necessarily drawn to scale.

DETAILED DESCRIPTION

Described below are embodiments of a system that can be used to create an image of a material using an appropriate optical imaging technique. The optical imaging technique processes light that is reflected off of the material by laterally scanning a scanning element and axially refocusing a variable focus lens. In some cases, the system images in vivo and in situ skin using optical coherence microscopy (OCM). OCM enables imaging at a relatively high resolution to depths below the surface of the material. By laterally scanning using the scanning element and axially scanning using the variable focus lens, high resolution is maintained for each lateral and axial point imaged, and imaging occurs quickly so as to avoid at least some of the distortion caused by movements, such as breathing and heart beats. In such cases, the system can facilitate diagnosis of medical conditions, such as skin cancer, without surgical biopsy.

Figure 1:
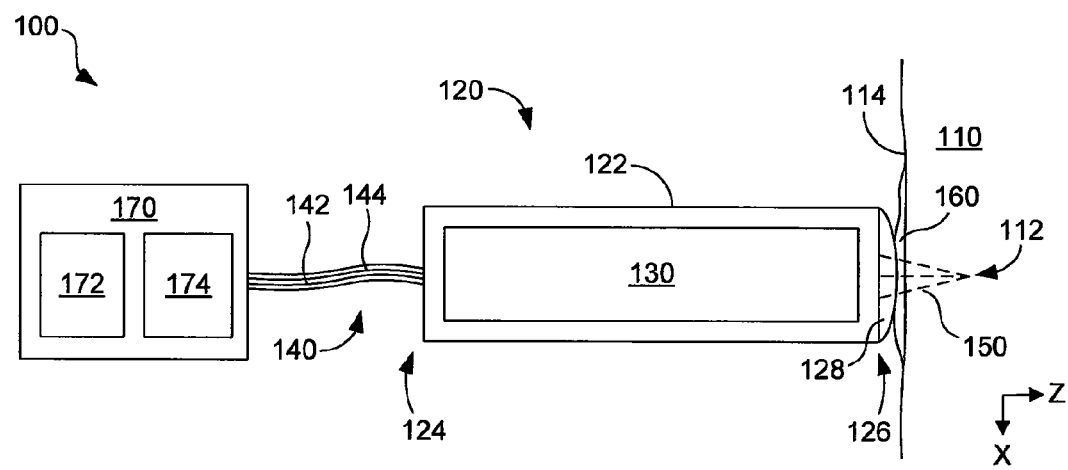
FIG. 1 is a schematic side view of an embodiment of a system that can be used to image a material.

FIG. 1 is a side view of an embodiment of an imaging system 100 that can be used to image a material 110. The imaging system 100 includes an optical instrument 120 and a control unit 170. A light source 172 of the control unit 170 communicates light 150 over a cord 140 to the instrument 120. An optical system 130 within the instrument 120 focuses the light 150 on a point 112 of the material 110, as described below with reference to FIG. 2. The light 150 that is reflected from the point 112 is returned through the optical system 130 and over the cord 140 to the processing system 174 of the control unit 170. The processing system 174 then processes the light 150 to create an image pixel corresponding to the point 112 of the material 110. The process is then repeated for other points within the material 110 until a complete image is generated. In some cases, the material 110 comprises soft tissue. For example, the material 110 can be in vivo and in situ skin tissue, or tissue located within the body, such as cervical tissue or throat tissue.

As is further shown in FIG. 1, the instrument 120 includes a housing 122 that contains the optical system 130. The cord 140 is coupled to a proximal end 124 of the housing 122 and communicates light 150 from the light source 172 to the optical system 130, and from the optical system back to the processing system 174. By way of example, the cord 140 comprises a fiber optic fiber or cable 142. The cord 140 may also comprise an electrical wire 144 that communicates electricity to the optical system 130 for the purpose of powering one or more components of the optical system. An imaging window 128 at a distal end 126 of the instrument 120 allows light 150 to pass from the optical system 130 to the material 110 and back to the optical system.

To limit the tendency of a surface 114 of the material 110 to reflect the light 150 back to the optical system 130, an immersion material 160, such as an oil or gel, having approximately the same refractive index as the material 110 can be placed between the instrument 120 and the material. In embodiments in which the material 110 is skin, a immersion material 160 having approximately the same refractive index as skin may be used.

A variety of materials can be used to construct the instrument 120 and the cord 140. For example, the housing 122 of the instrument 120 can be made of a plastic or a metal material. The cord 140 can comprise a flexible lumen that encloses the fiber optic fiber or cable 142 and the electrical wire 144. The cord 140 can have an outer diameter that is smaller than the outer diameter of the housing 122, and a length that is long enough to extend from the control unit 170 to the material 110. The imaging window 128 can be a curved plate on the distal end 126 of the instrument 120, although other configurations are possible. For example, the imaging window 128 can be flat. The imaging window 128 can be made of a suitable transparent material, such as glass, sapphire, or a clear, biocompatible polymeric material. In some embodiments, the material used to form the imaging window 128 can also be used to form a portion or the entirety of housing 122.

The instrument 120 can have a variety of shapes. In the embodiment shown in FIG. 1, the instrument 120 is configured as an elongated handheld probe that may be easily grasped by an appropriate user, such as a physician or nurse. In other embodiments, the instrument 120 may be configured as an optical microscope.

The light source 172 can be any light source configured to supply light 150 over the fiber optic cable 142. In some embodiments, the light source 172 may emit high-intensity, low-coherence, near-infrared (NIR) light. By way of example, the light source 172 comprises a pulsed infrared laser, such as a mode-locked, titanium-doped sapphire (Ti: Sa) femto-laser. The light source 172 can have a central wavelength in the range of approximately 700 nm (nanometers) to 900 nm, for example 800 nm, and a spectral bandwidth of approximately 120 nm. The light source 172 can be tunable to emit high-power pulses that enable two-photon excitation of features contained in the material 110, in which case two-photon fluorescence spectroscopy may be enabled. For example, the light source 172 may emit pulses having a peak power of approximately a few hundred kilowatts (kW).

The processing system 174 may process light 150 reflected from the material 110 using optical imaging techniques, such as OCM and/or fluorescence spectroscopy. In some embodiments, OCM can be performed in conjunction with fluorescence spectroscopy so as to enable the generation of high-resolution images of the structure of the material 110 and the chemical composition of the material. In such an embodiment, the OCM images and fluorescence spectroscopy images can be compared or superimposed on top of each other for visual inspection and/or computer analysis. For example, a processing system 174 can be used such as the processing system described in Assignee's currently pending U.S. patent application entitled "Systems and Methods for Performing Simultaneous Tomography and Spectroscopy," filed Apr. 14, 2006, having Ser. No. 11/404,322, which is hereby incorporated by reference in its entirety.

To enable the use of an optical imaging technique such as OCM, the instrument 120 focuses light 150 at an appropriate resolution on discrete points 112 of the material 110 that are at or below the surface 114 of the material. The optical system 130 laterally and axially scans the material 110 with light 150, focusing the light onto laterally and axially adjacent points 112, and reflecting the light back to the processing system 174, which uses the light to reconstruct images of the material pixel by pixel. For example, the images can be two-dimensional images of cross-sections of the material 110, such as x-z images (see FIG. 1), which may be aggregated to generate a three-dimensional "image" of the material.

For purposes of this disclosure, the term "lateral" refers to a direction that is substantially perpendicular to the optical axis of the instrument 120, such as the x direction indicated in FIG. 1 or a direction (e.g., y direction) that is perpendicular to the x and z directions. "Lateral scanning" comprises scanning the material 110 in the lateral direction, which may be substantially parallel to its surface 114. The term "axial" refers to a direction that is substantially parallel to the optical axis of the instrument 120, such as the z direction indicated in FIG. 1, and "axial scanning" comprises scanning in the axial direction, which may be substantially perpendicular to the surface 114 of the material 120.

While lateral and axial scanning are accomplished using components of the optical system 130, these functions can be automatized and synchronized by the processing system 174. For example, the processing system 174 may include software that performs these functions, such as Labview software.

In some embodiments, the optical system 130 of the instrument 120 achieves micron-scale resolution of the material 110 at points 112 that are located on a millimeter-scale depth below the surface 114 of the material. Such resolution may facilitate diagnosis of medical conditions, such as skin cancer. For example, imaging at a micrometer-scale resolution of at least about 5 microns ($\mu$m) (i.e., less than or equal to 5 $\mu$m) enables resolving individual cells of the epidermis, such as basal cells, which may facilitate differentiation of normal skin cells from cancerous skin cells. By way of example, the material may be imaged to an axial depth in the range of about 0.5 millimeters (mm) to about 2 mm. Imaging to a depth of at least about 1 mm enables imaging through the entire epidermis, which is the layer of the skin in which most types of skin cancer develop. Such imaging therefore may enable an evaluation of the vertical depth of the cancer, which could be indicative of the extent and significance of the cancer. With resolutions of at least about 5 $\mu$m (i.e., less than or equal to 5 $\mu$m) in both the axial and lateral directions, the optical system 130 may be said to enable generation of double ultra-high resolution (DUHR) images, with the term "double" identifying both axial and lateral resolution, as opposed to axial resolution alone.

Figure 2:
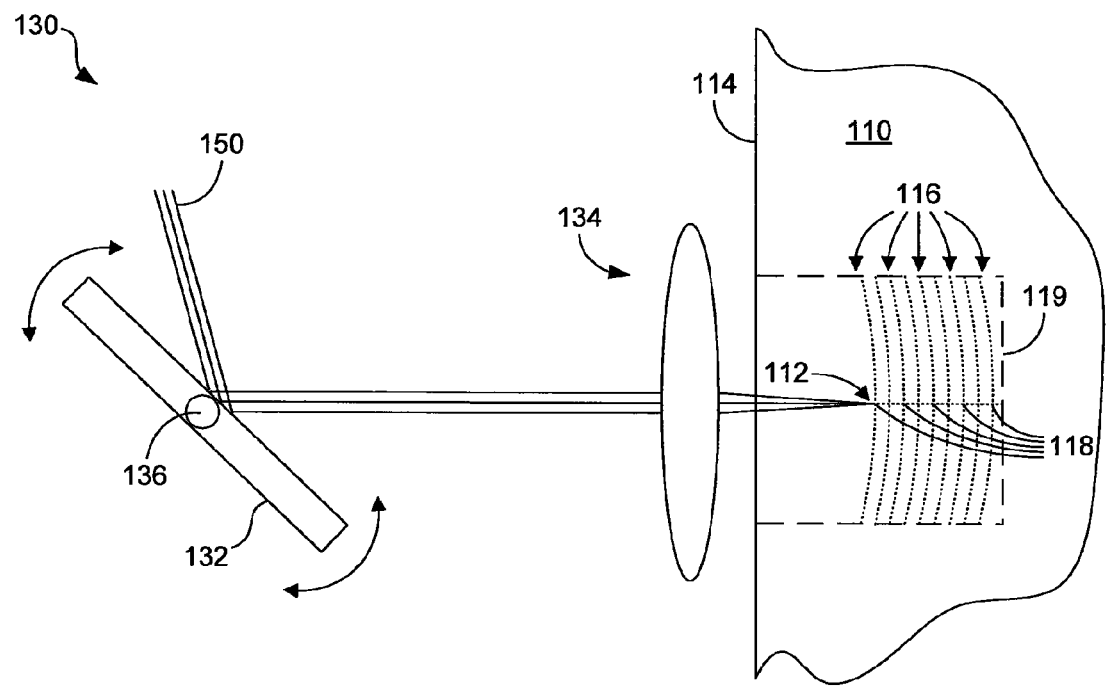
FIG. 2 is a schematic side view of a first embodiment of an optical system that can be used in an instrument shown in FIG. 1.

FIG. 2 is a side view of a first embodiment of an optical system 130 that can be used in the instrument 120 shown in FIG. 1. The optical system 130 includes a scanning element 132 and a variable focus lens 134. Together the scanning element 132 and the variable focus lens 134 laterally and axially scan light 150 relative to the material 110, focusing the light on discrete points 112 of a cross-section 119 of the material at or below the surface 114 of the material, and reflecting the light back to the processing system 174.

Lateral scanning is accomplished by scanning the scanning element 132, which redirects the light 150 to laterally adjacent points 112 of the material 110 along a chosen lateral scan 116. The light 150 reflected from points 112 of the material 110 along the lateral scan 116 may be used by the processing system 174 to construct a one-dimensional image of the material along the lateral scan 116. Axial scanning is accomplished by readjusting the variable focus lens 134 to alter the focal length of the lens, such that the lens is properly focused for the chosen axial depth 118. At that axial depth 118, a lateral scan 116 is performed by scanning the scanning element 132. Once the lateral scan 116 is complete, the variable focus lens 134 may be refocused for a new axial depth 118, and a further lateral scan 116 may be performed at that new axial depth by scanning the scanning element 132. In this manner, light 150 collected during lateral scans 116 at various axial depths 118 is combined and processed to produce a two-dimensional image of the material 110 along the cross-section 119.

The scanning element 132 can comprise a scanning mirror, such as a micro-electro-mechanical-system (MEMS) mirror or a galvo mirror. Regardless, the scanning element 132 may have an axis 136 about which the element can be rotated, as depicted in FIG. 2. In other embodiments, the scanning element 132 can rotate about two axes (not shown) or the optical system 130 may have two single-axis scanning elements (not shown) to enable scanning in multiple directions.

As mentioned above, the resolution of the instrument 120 does not vary as the scanning element 132 rotates about the axis 136 to direct the light 150 onto discrete points 112 of a lateral scan 116. As shown in FIG. 2, each point 112 on the lateral scan 116 may be a fixed distance from the axis 136 of rotation of the scanning element 132, such that the lateral scan 116 has a slight radius of curvature. As a result, the resolution of the instrument 120 is invariably maintained for each point 112 on a chosen lateral scan 116. It should be noted that the radius of curvature is exaggerated in FIG. 2 for illustrative purposes, and that the lateral scan 116 may be substantially linear in cases in which the cross-section 119 has a lateral dimension that is relatively small in comparison with the distance from the axis 136 of rotation.

The distance between points 112 on the lateral scan 116 may be varied according to the desired resolution of the instrument 120. The distance between points 112 may be about one-half the desired resolution. For example, in cases in which the desired resolution is about 5 µm, the distance between points on the lateral scan may be about 2.5 µm.

To accomplish axial scanning, the focal length of the variable focus lens 134 is dynamically changed to alter the depth of focus of the lens. Because the variable focus lens 134 is refocused for each axial depth 118, the lens maintains an invariant resolution throughout the axial scanning. In some embodiments, a variable focus lens 134 that refocuses rapidly is preferred. For biological applications, response time of the dynamically focused lens 134 may be on the order of tens of milliseconds (ms). Such rapid refocusing can be achieved, for example, using a lens that refocuses without mechanical translation, i.e., physical movement in the axial direction. Such a lens remains axially stationary, unlike a conventional system that refocuses by axially translating bulk optics. Examples of lenses that do not mechanically translate include liquid lenses and liquid crystal lenses.

The imaging speed of the instrument 120 may be about 5 frames per second (fps) to more than about 30 fps, with each frame corresponding to a single cross-section 119 of the material 110. The imaging speed may be a function of the lateral and axial dimensions of the cross-section 119 as well as the desired resolution of the resultant image. The imaging speed may also be a function of the number of axial depths 118 at which lateral scans 116 are performed, as well as the time consumed per axial depth 118 by refocusing the dynamically focused lens 134 and performing the lateral scan 116. In other words, there is a relationship among the imaging speed, the size of the cross-section 119, the desired resolution, the number of axial depths 118, and the speed of refocusing and laterally scanning per axial depth 118.

Figure 3A:
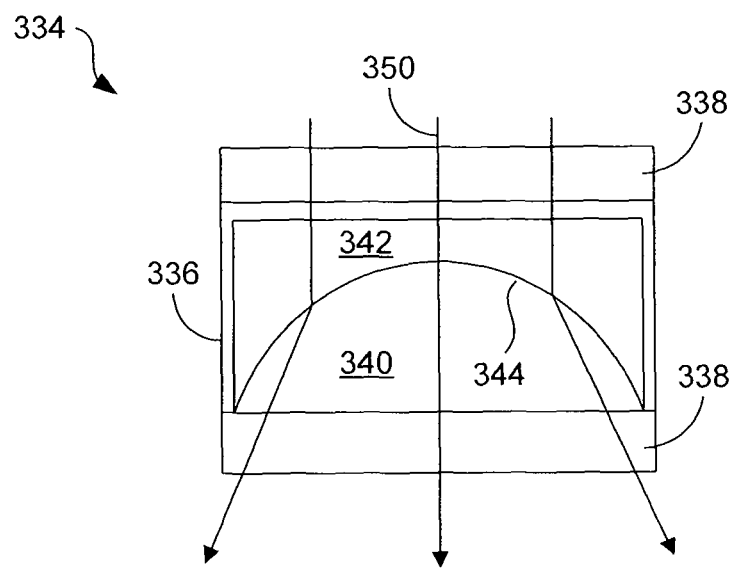
FIGS. 3A and 3B are side views of an embodiment of a variable focus lens that can be used in the optical system of FIG. 2, each of FIGS. 3A and 3B illustrating the lens at a different focus setting.
Figure 3B:
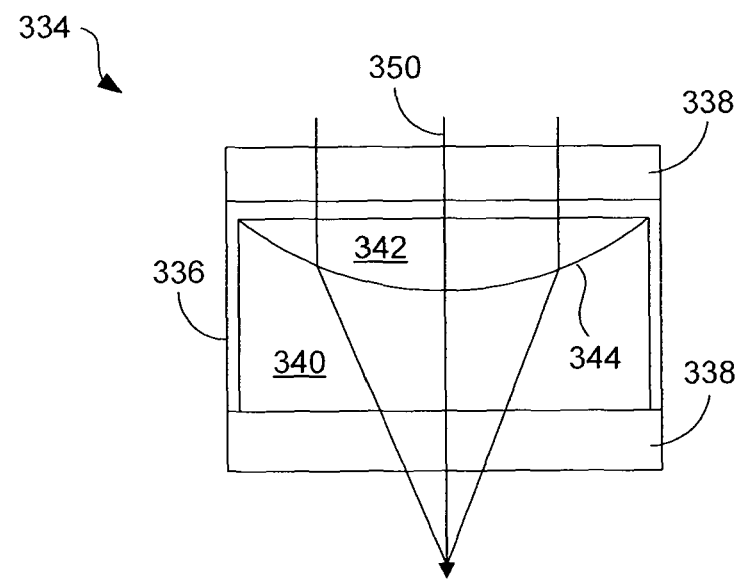

FIG. 3A is a side view of an embodiment of a liquid lens 334 that can be used in the optical system 130 shown in FIG. 2. The liquid lens 334 comprises a tubular casing 336 with transparent end caps 338. Light 350 may pass through a first end cap 338 into the lens 334 and then out of the lens through a second end cap 338. Within the tubular casing 336 are a first liquid 340 and a second liquid 342. The liquids 340 and 342 are immiscible liquids having approximately the same density but different refractive indexes. The first liquid 340 may be electrically conductive and the second liquid 342 may be nonconductive. For example, the first liquid 340 may be an electrically conductive aqueous solution and the second liquid 342 may be a nonconductive oil. Because the liquids 340 and 342 are immiscible with respect to each other, a meniscus 344 forms between the two liquids, and a radius of curvature of the meniscus determines the focal length of the lens 334. The liquid lens 334 may be refocused by altering the radius of curvature of the meniscus 344, which may be accomplished by applying a voltage to a hydrophobic coating (not visible) that covers the interior of the tubular casing 336 and one of the end caps 338. Applying a voltage alters the hydrophobicity of the coating causing the electrically conductive first liquid 340 to become more or less resistant to the hydrophobic coating. As the first liquid 340 moves into greater or lesser contact with the hydrophobic coating 346, the radius of curvature of the meniscus 344 changes and the focal length of the lens 334 is adjusted, as shown in FIG. 3B. Therefore, such a liquid lens 334 can be refocused electrically, unlike a standard lens that refocuses by mechanical translation. Such liquid lenses may be available from Philips Corporation and Varioptic, Inc.

As stated above, the optical system 130 may laterally and axially scan light 150 that is focused at a high resolution on points 112 that lie at or below the surface 114 of the material 110. In such cases, high resolution is enabled by the variable focus lens 334, which may have an f-number that is between 1 and 100. High resolution is also enabled by using an optical system 130 having a relatively high numerical aperture. For example, the numerical aperture of the optical system 130 may be in the range of about 0.2 to about 0.9.

High resolution may also be enabled by the wavelength of the light 150 that is focused on the material 110, such as NIR light. NIR light enables imaging at depths below the surface 114 of the material 110, especially in the case of skin, because NIR light falls within the "diagnostic window" of skin in which absorption by skin is relatively low. In the case of skin, the resolution of the instrument 120 may be at least about 5 µm, as mentioned above.

Figure 4:
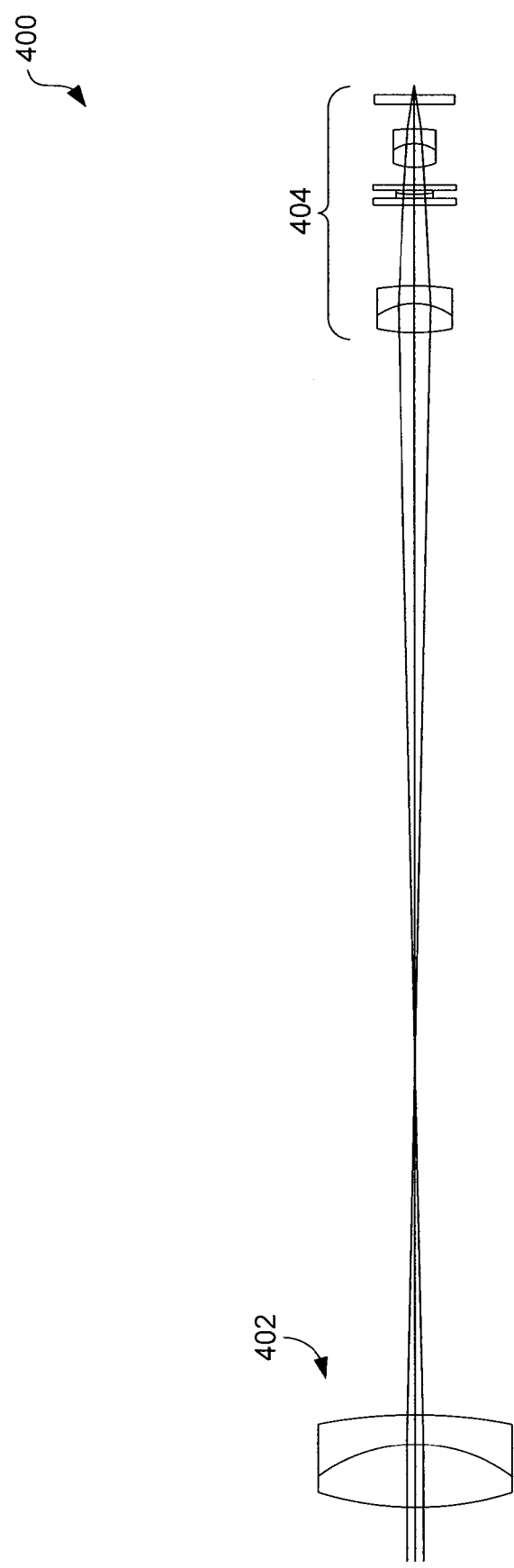
FIG. 4 is a side view of a second embodiment of an optical system that can be used in the instrument shown in FIG. 1.

FIG. 4 is a side view of a second embodiment of an optical system 400 that can be used in the instrument 120 shown in FIG. 1. Like the optical system 130, the optical system 400 can facilitate DUHR imaging at or below a surface of a material being evaluated. In addition, the optical system 400 is configured to scan relatively quickly and to be relatively compact. For example, the optical system 400 can, in some embodiments, scan at a rate in the range of about 1 fps to about 30 fps. Because of the reduced size, the optical system 400 may be small enough to fit inside a handheld probe. In cases in which the material under evaluation is in vivo tissue, a compact, handheld instrument may be conducive to imaging in a clinical environment. By quickly imaging the tissue, such an instrument reduces errors associated with movements of a patient that result from breathing or heart beats.

As indicated in FIG. 4, the optical system 400 is very simple in design and therefore only includes a very limited number of optical elements. Those optical elements include a single scan lens 402 and an objective 404. Notably, the optical system 400 comprises no field lens or microlenslet array. Although not shown in FIG. 4, the optical system 400 may further include a scanning element, such as a MEMS mirror or a galvo mirror. In embodiments in which imaging across three dimensions is not desired, a single-axis scanning element may be used instead of a dual-axis scanning element because a single-axis scanning element rotates at a relatively faster rate than a dual-axis scanning element.

As illustrated in FIG. 4, the scan lens 402 can comprise a doublet lens. Alternatively, the scan lens 402 can comprise a simple lens. Regardless, angles of the rays exiting the scan lens 402 are controlled to match the entry rays of the optical system 400. As the magnification of the system 400 increases, the complexity of the scan lens 402 can also increases or multiple optical elements may be used.

Figure 5A:
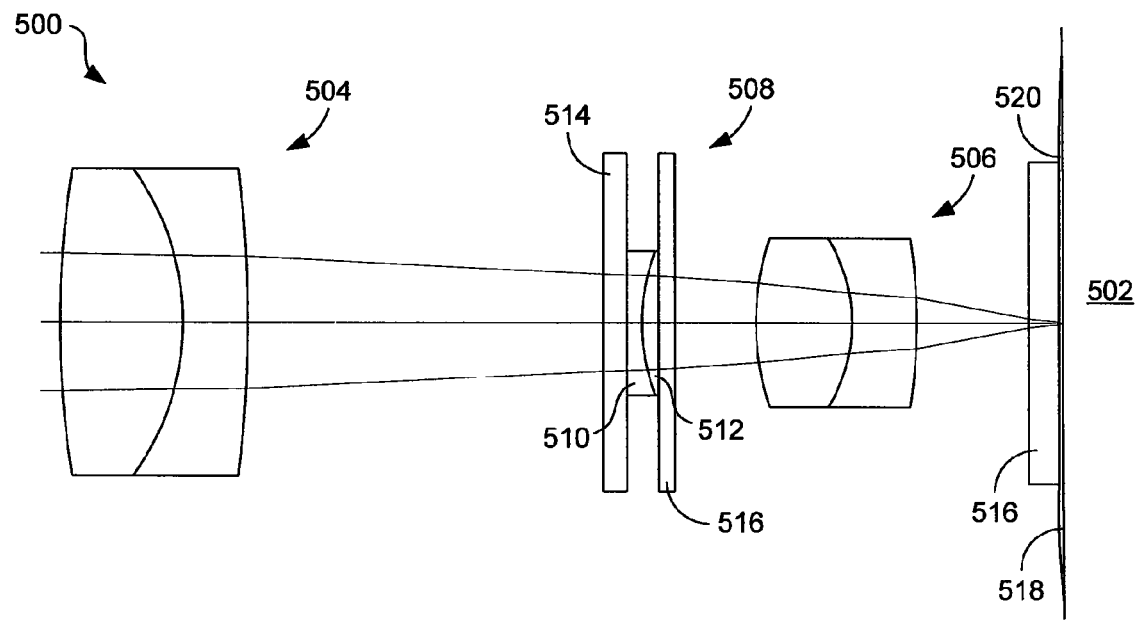
FIGS. 5A-5C are side views of an embodiment of an objective that can be used in the optical system of FIG. 4, each of FIGS. 5A-5C illustrating the objective at a different focus setting.
Figure 5B:
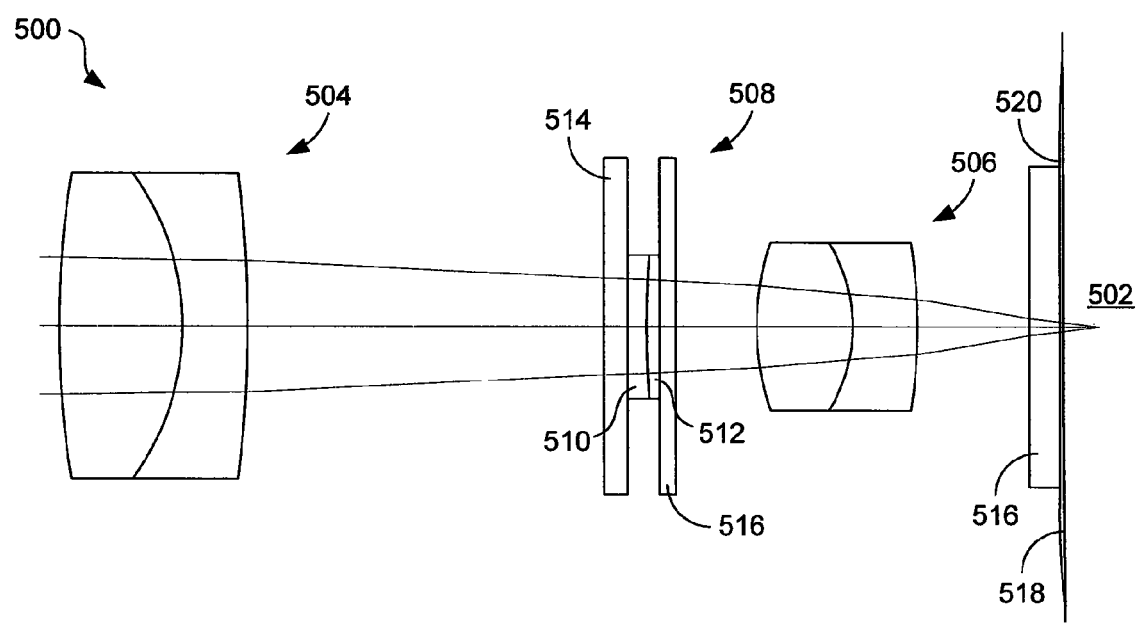
Figure 5C:
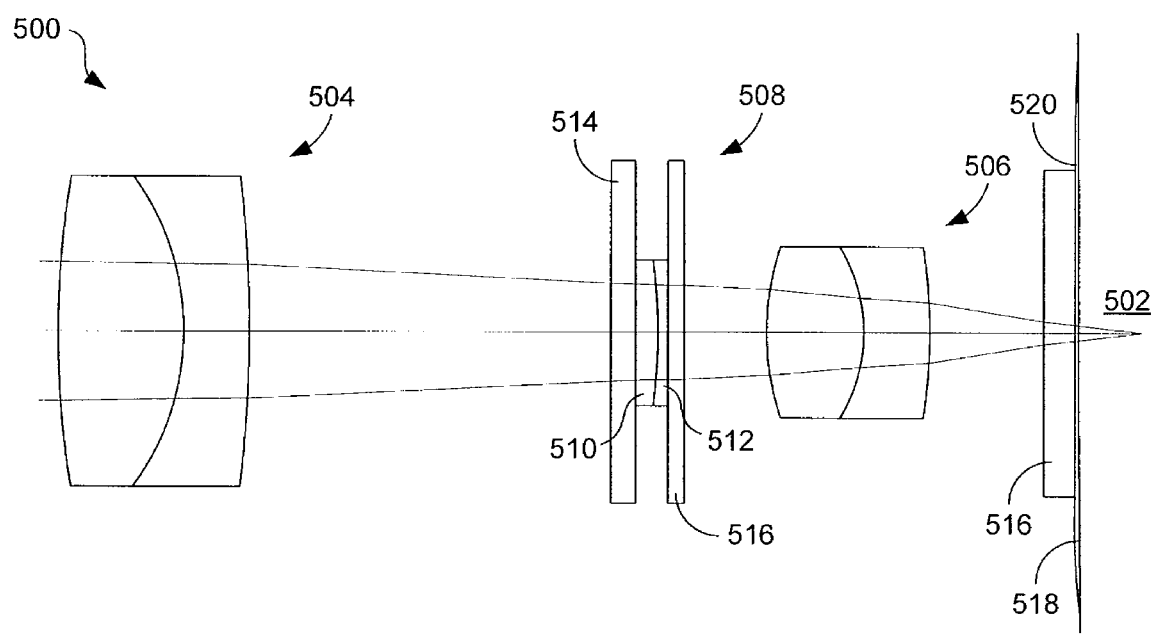

FIGS. 5A-5C illustrate an embodiment of an objective 500 that can be used in the optical system 400. As shown in FIG. 5A, the objective 500 only includes three optical elements: first and second doublet lenses 504 and 506 and a variable focus lens 508. In the illustrated embodiment, the variable focus lens 508 comprises a liquid lens that includes two immiscible liquids 510 and 512 and two clear plates 514 and 516.

Light that enters the objective 500 is manipulated by the first doublet lens 504 such that the beam is properly sized to enter the variable focus lens 508. The second doublet lens 506 further focuses the light, which then passes through an imaging window 516. In use, the imaging window 516 is placed in contact with a surface 518 of the material 502 and/or in contact with an immersion material 520 provided on the surface. Without the variable focus lens 508, the two-doublet configuration of FIGS. 5A-5C can be described as a Lister-type microscope objective, which operates well to about 0.3 numerical aperture. The inclusion of the variable focus lens 508 in the aperture stop of a Lister-type design, however, yields a novel dynamic focus microscope objective. As the numerical aperture increases, the complexity of the optical design likewise increases, and the design departs from a Lister-type design.

As described above, the effective focal length of a variable focus lens, and therefore the optical system in which it is used, can be dynamically changed to enable scanning at various depths of a material. Such depths include the surface of the material (i.e., depth=0). In FIG. 5A, the variable focus lens 508 has been controlled to focus upon the surface 518 of the material 502. In FIG. 5B, the variable focus lens 508 has been controlled to focus upon a point about 1 mm below the surface 518 of the material 502. In FIG. 5C, the variable focus lens 508 has been controlled to focus upon a point about 2 mm below the surface 518 of the material 502.

As also described above, the variable focus lenses can be adjusted relatively quickly given that no physical translation of bulk optics is required. To further improve speed, the variable focus lens 508 is placed relatively close to the material 502 where the light beam is relatively smallest. This enables use of a relatively small variable focus lens 508. By way of example, the variable focus lens 508 can have a diameter of about 3 mm. The small size of the variable focus lens 508 reduces the size of the objective 500. Moreover, the small size increases the speed at which the variable focus lens 508 can be refocused. Current technology enables a response time of approximately 80 milliseconds (ms) for the variable focus lens 508. Using state of the art sources and detectors, imaging can be performed at a rate of at least approximately 9 fps for a 1 mm cubic sample.

Figure 6A:
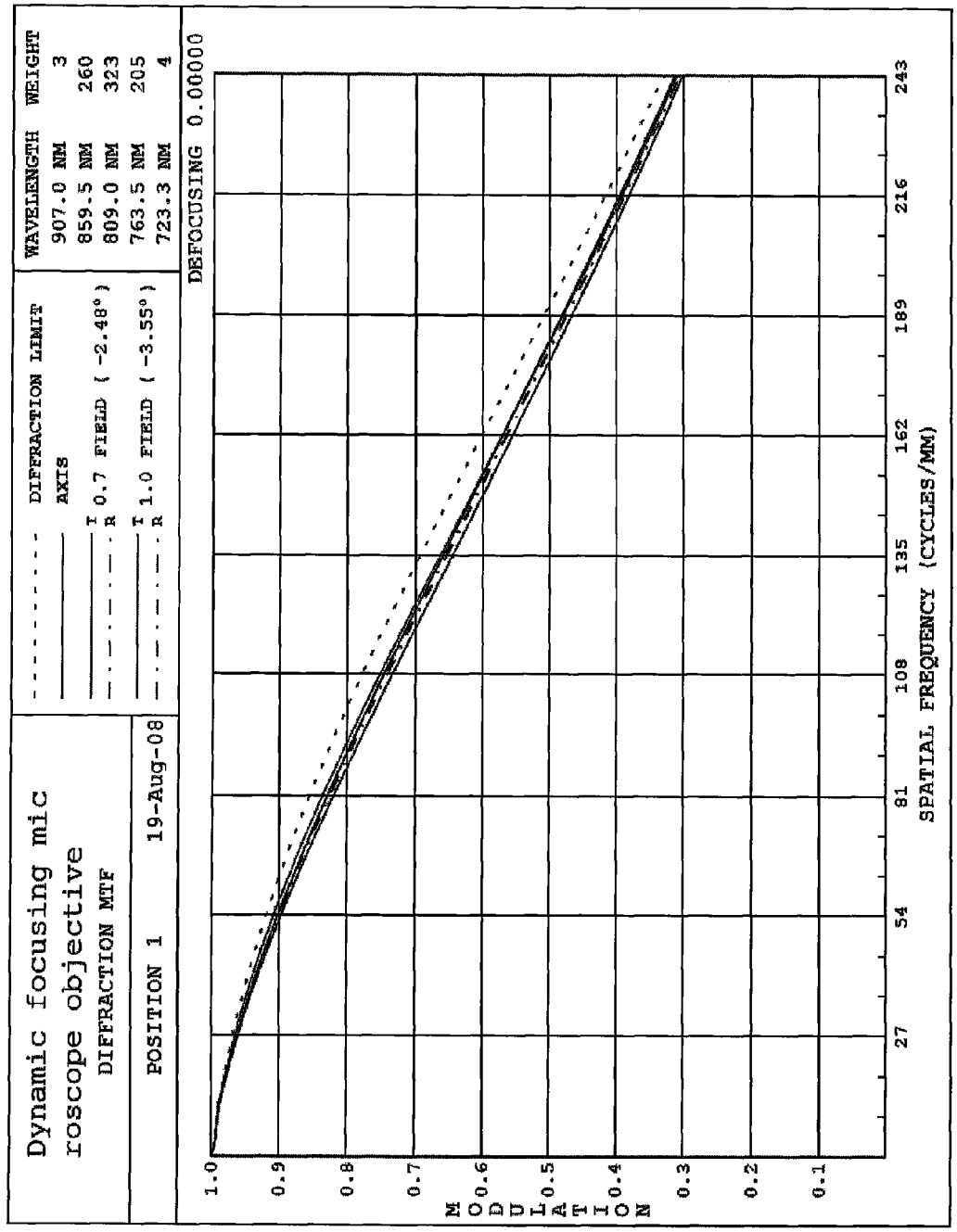
FIGS. 6A-6C are modulation transfer functions of the optical system shown in FIG. 4, corresponding to the focus settings illustrated in FIGS. 5A-5C, respectively.
Figure 6B:
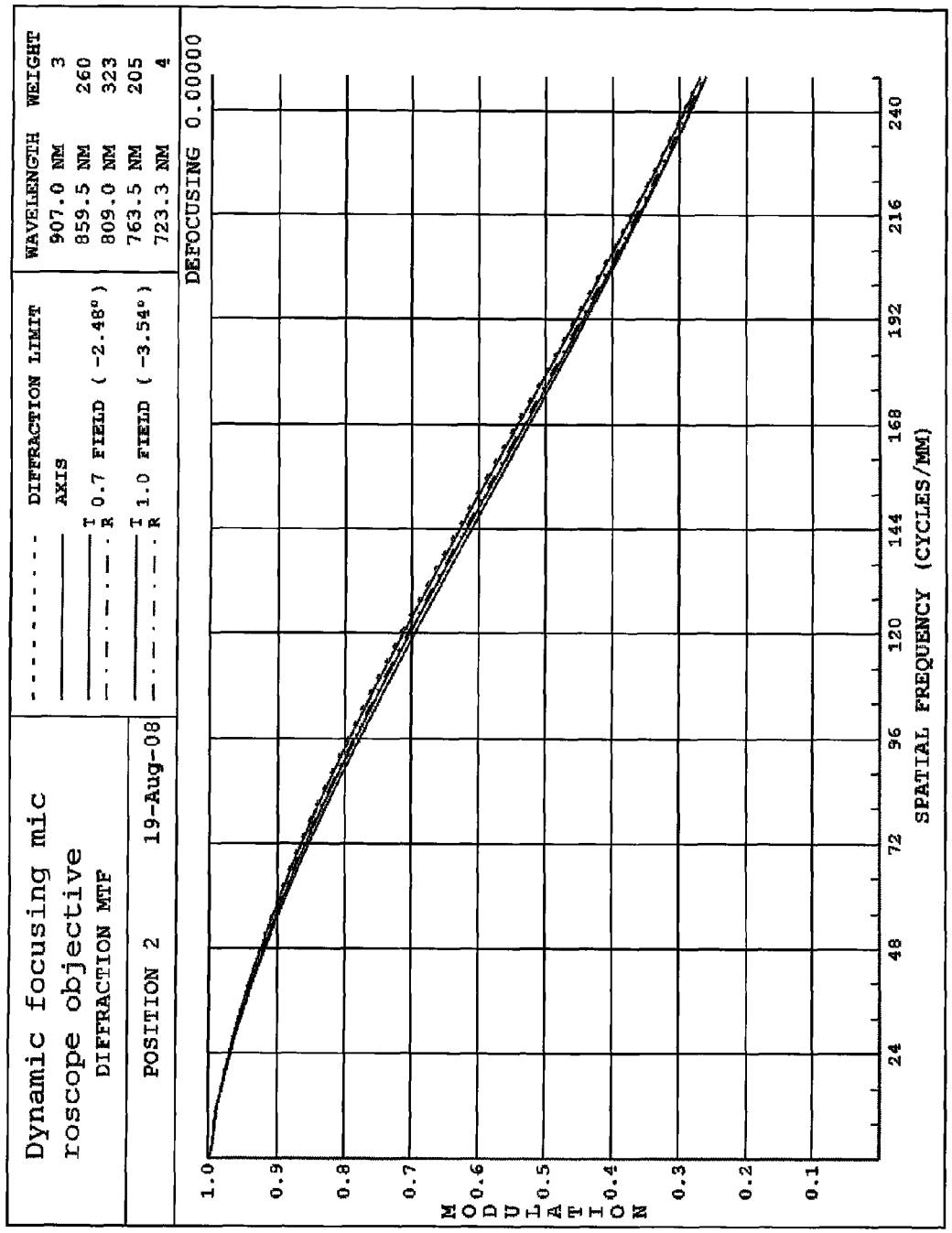
Figure 6C:
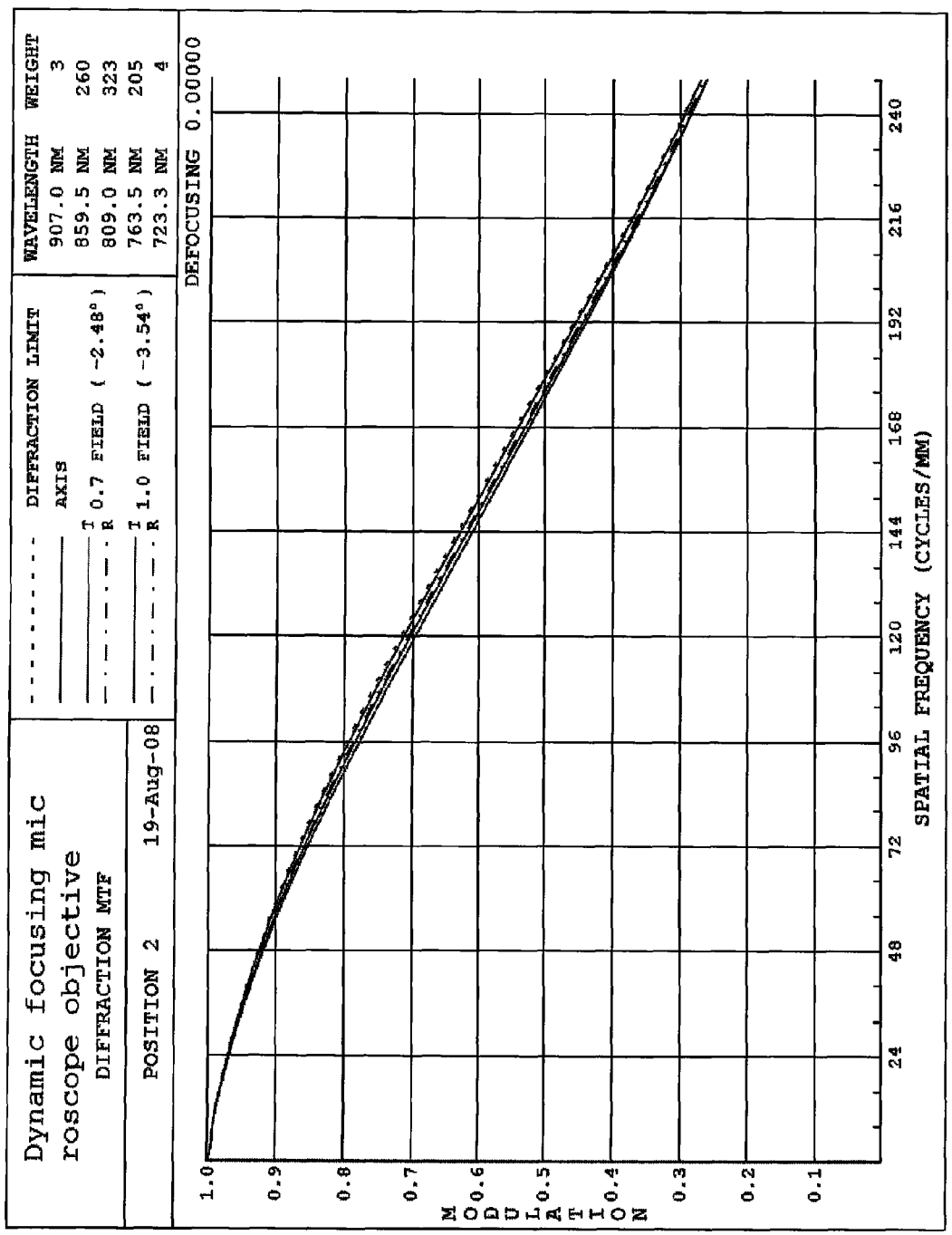

FIGS. 6A-6C are modulation transfer functions (MTFs) for the optical system 400 of FIG. 4, corresponding to the focus settings illustrated in FIGS. 5A-5C, respectively. Therefore, FIG. 6A shows the MTF for the system 400 when focused at zero depth, FIG. 6B shows the MTF for the system when focused at a depth of about 1 mm, and FIG. 6C shows the MTF for the system when focused at a depth of about 2 mm. Plotted in each graph is the diffraction limit (dashed line) and frequency response curves of tangential (T) and sagittal (R) light rays. As is apparent from FIGS. 6A-6C, each MTF curve closely follows the diffraction limit curve.

The instruments described above facilitate rapid and accurate diagnosis of cancer by enabling imaging of tissue at a high and invariant axial and lateral resolution at and below the tissue surface. By scanning quickly, the instruments reduce errors that can occur due to patient movement. For example, embodiments of the instruments can scan a material measuring approximately 1 mm laterally by approximately 1 mm axially using NIR light at a resolution of approximately 4 µm. In such case, measurements can be made at 500 points per lateral scan, with each point being 2.5 µm from the next laterally adjacent point. In embodiments in which the lateral en face scan is performed using a 90 hertz (Hz) scanning mirror and is detected at the rate of 90,000 A-scans/s, acquiring the image of one cubic slice of the sample centered around the focal point may require about 2.8 seconds. In this example, such en face scans are performed by refocusing the variable focus lens 508 at 20 discrete axial depths spaced out by the depth of focus of the microscope objective. This scheme enables the acquisition of a 1 mm cubic cross-section in 56 seconds (i.e. 9 fps) and will therefore facilitate in vivo sequential visualization of the en face scans, while at the same time a resolution of 4 µm will be maintained both axially and laterally.

While particular embodiments of optical system have been disclosed in detail in the foregoing description and drawings for purposes of example, those skilled in the art will understand that variations and modifications may be made without departing from the scope of the disclosure. All such variations and modifications are intended to be included within the scope of the present disclosure.

The invention claimed is:

1. A handheld optical probe comprising:
   a housing sized and configured for grasping by a user;
   an optical system provided within the housing, the optical system including a scanning element comprising a pivotable mirror and an objective having a variable focus lens that can be electronically controlled to change the focal length of the optical system without mechanical translation; and
   an imaging window mounted to the housing through which images of a subject material can be transmitted to the optical system;
   wherein the optical system can axially and laterally scan the subject material by sequentially focusing at an axial depth using the variable focus lens and laterally scanning the material at that depth using the scanning element.

2. The probe of claim 1, wherein the pivotable mirror is a micro-electro-mechanical-systems (MEMS) mirror or a galvo mirror that can be pivoted for laterally scanning.

3. The probe of claim 1, wherein the variable focus lens is a liquid lens.

4. The probe of claim 1, wherein the variable focus lens is a liquid crystal lens.

5. The probe of claim 1, wherein the optical system has a resolution of at least about 5 microns in both the axial and lateral directions.

6. The probe of claim 1, wherein the objective comprises no more than three optical elements.

7. The probe of claim 6, wherein the optical elements of the objective comprise only the variable focus lens and two doublet lenses.

* * * * *